(12) United States Patent
Yamamoto et al.

(10) Patent No.: US 11,077,907 B2
(45) Date of Patent: Aug. 3, 2021

(54) SADDLE-RIDING-TYPE VEHICLE CANISTER ARRANGEMENT STRUCTURE

(71) Applicant: HONDA MOTOR CO., LTD., Tokyo (JP)

(72) Inventors: Kanta Yamamoto, Wako (JP); Hitoshi Nishino, Wako (JP); Kohei Abe, Wako (JP); Jumpei Mishiro, Wako (JP); Hidetoshi Wakasa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 305 days.

(21) Appl. No.: 16/226,773

(22) Filed: Dec. 20, 2018

(65) Prior Publication Data

US 2019/0202516 A1     Jul. 4, 2019

(30) Foreign Application Priority Data

Dec. 28, 2017    (JP) .............................. JP2017-254349

(51) Int. Cl.
*B62K 11/04*       (2006.01)
*F02M 25/08*       (2006.01)
(Continued)

(52) U.S. Cl.
CPC ......... *B62J 35/00* (2013.01); *B60K 15/03504* (2013.01); *B62J 15/00* (2013.01);
(Continued)

(58) Field of Classification Search
CPC .... B60K 15/03504; B60K 2015/03514; B62K 11/04
(Continued)

(56) References Cited

U.S. PATENT DOCUMENTS

2003/0121708 A1*  7/2003  Laivins ................... B62J 15/00
                                                   180/229
2011/0073399 A1*  3/2011  Seki ....................... B62J 37/00
                                                   180/219
(Continued)

FOREIGN PATENT DOCUMENTS

CN          2516435       10/2002
CN          201161643     12/2008
(Continued)

OTHER PUBLICATIONS

Machine language translation of JP-2013067272 obtained from patentscope.wipo.int on Dec. 2, 2020.*

(Continued)

*Primary Examiner* — Minnah L Seoh
*Assistant Examiner* — Hosam Shabara
(74) *Attorney, Agent, or Firm* — Amin, Turocy & Watson, LLP

(57) ABSTRACT

A saddle-riding-type vehicle canister arrangement structure is a canister arrangement structure of a saddle riding type vehicle, including: an engine that includes a crankcase; an exhaust pipe that extends downward at a frontward position of the crankcase from a front part of the engine and then passes below the engine; and a canister that recovers an evaporated fuel which is generated at a fuel tank, wherein the canister is arranged between the engine and the exhaust pipe at a frontward position of the crankcase.

6 Claims, 12 Drawing Sheets

(51) Int. Cl.
    *B60K 15/035* (2006.01)
    *B62J 15/00* (2006.01)
    *B62J 35/00* (2006.01)
    *B62J 37/00* (2006.01)
    *B62M 7/02* (2006.01)

(52) U.S. Cl.
    CPC .............. *B62J 37/00* (2013.01); *B62K 11/04* (2013.01); *B62M 7/02* (2013.01); *F02M 25/089* (2013.01); *F02M 25/0854* (2013.01); *B60K 2015/03514* (2013.01)

(58) Field of Classification Search
    USPC ........................................................ 123/519
    See application file for complete search history.

(56) References Cited

U.S. PATENT DOCUMENTS

| | | | |
|---|---|---|---|
| 2011/0284307 A1* | 11/2011 | Mori ........................ | B62J 37/00 180/296 |
| 2013/0075181 A1* | 3/2013 | Ashida ..................... | B62J 37/00 180/230 |
| 2015/0014080 A1 | 1/2015 | Takasaki et al. | |

FOREIGN PATENT DOCUMENTS

| | | |
|---|---|---|
| CN | 101468698 | 7/2009 |
| JP | 59-089280 | 5/1984 |
| JP | 60-036566 | 3/1985 |
| JP | 60-036567 | 3/1985 |
| JP | 62-058278 | 4/1987 |
| JP | 05-086994 | 4/1993 |
| JP | 2011-074801 | 4/2011 |
| JP | 2012-007537 | 1/2012 |
| JP | 2013-067272 | 4/2013 |
| JP | 2013-071486 | 4/2013 |
| JP | 2013067272 A * | 4/2013 |
| JP | 2014-162415 | 9/2014 |
| JP | 2015-016758 | 1/2015 |
| JP | 2016-049902 | 4/2016 |
| JP | 2017-074847 | 4/2017 |

OTHER PUBLICATIONS

Japanese Office Action for Japanese Patent Application No. 2017-254349 dated Aug. 27, 2019.

Extended European Search Report for European Patent Application No. 18213911.3 dated May 27, 2019.

Chinese Office Action for Chinese Patent Application No. 201811587737.2 dated Sep. 1, 2020.

* cited by examiner

SADDLE-RIDING-TYPE VEHICLE CANISTER ARRANGEMENT STRUCTURE

CROSS-REFERENCE TO RELATED APPLICATION

Priority is claimed on Japanese Patent Application No. 2017-254349, filed on Dec. 28, 2017, the contents of which are incorporated herein by reference.

BACKGROUND

Field of the Invention

The present invention relates to a saddle-riding-type vehicle canister arrangement structure.

Background

In the related art, as a saddle-riding-type vehicle canister arrangement structure, for example, one such structure disclosed in Japanese Unexamined Patent Application, First Publication No. H05-86994 is known. This is a structure in which an exhaust pipe of an engine is directed rearward along one side part of a cylinder, and a canister is arranged at a frontward position of a crankcase on the opposite side of the exhaust pipe. In Japanese Unexamined Patent Application, First Publication No. H05-86994, by arranging the canister at the opposite position that is far from the exhaust pipe, a pipe which is connected to the canister is prevented from interfering with the exhaust pipe or being thermally affected.

SUMMARY

However, when the exhaust pipe extends downward at the frontward position of the crankcase from a front part of the engine and then passes below the engine, there is a possibility that it becomes difficult to ensure an arrangement space of the canister at the frontward position of the crankcase.

An object of an aspect of the present invention is to arrange a canister in a small space even when an exhaust pipe extends downward at a frontward position of a crankcase from a front part of an engine and then passes below the engine in a saddle-riding-type vehicle canister arrangement structure.

(1) A saddle-riding-type vehicle canister arrangement structure according to an aspect of the present invention is a canister arrangement structure of a saddle riding type vehicle, including: an engine that includes a crankcase; an exhaust pipe that extends downward at a frontward position of the crankcase from a front part of the engine and then passes below the engine; and a canister that recovers an evaporated fuel which is generated at a fuel tank, wherein the canister is arranged between the engine and the exhaust pipe at a frontward position of the crankcase.

(2) The above saddle-riding-type vehicle canister arrangement structure may further include a pair of right and left downward tubes that extend downward from a head pipe, wherein the exhaust pipe may extend to a frontward position of the pair of right and left downward tubes from the front part of the engine and be then bent to extend downward, and the canister may be arranged at a space in a vehicle width direction between the pair of right and left downward tubes.

(3) In the above saddle-riding-type vehicle canister arrangement structure, the canister may be arranged to be directed in a vehicle width direction.

(4) In the above saddle-riding-type vehicle canister arrangement structure, the canister may be arranged at a position that is overlapped with a vehicle body right-to-left center line in a front view.

(5) The above saddle-riding-type vehicle canister arrangement structure may further include a protection member that protects the canister.

(6) The above saddle-riding-type vehicle canister arrangement structure may further include a fender that covers a front wheel from an upside, wherein the engine may further include a cylinder that protrudes upward from the crankcase, and at least part of the canister may be positioned at a space in a vertical direction between a lower end of the fender and a lower end of the cylinder.

(7) The above saddle-riding-type vehicle canister arrangement structure may further include a protection member that protects the canister, wherein the protection member may include a slant part that is slanted such that a more rearward side is located at a higher position.

(8) The above saddle-riding-type vehicle canister arrangement structure may further include an oil cooler that is located at a frontward position of the cylinder, wherein an opening part that is directed to a lower position of the oil cooler and that is directed to an upper part of the canister may be provided on the fender.

According to the above configuration (1), the canister is arranged between the engine and the exhaust pipe at the frontward position of the crankcase, and thereby, it is possible to effectively use the space in the front-to-rear direction between the engine and the exhaust pipe. Accordingly, it is possible to arrange the canister in a small space even when the exhaust pipe extends downward at the frontward position of the crankcase from the front part of the engine and then passes below the engine.

According to the above configuration (2), by the canister being arranged at the space in the vehicle width direction between the pair of right and left downward tubes, it is possible to connect the canister to at least one of the pair of right and left downward tubes, and therefore, the attachment property of the canister is excellent. Additionally, it is possible to effectively use the space in the vehicle width direction between the pair of right and left downward tubes, and therefore, it is possible to arrange the canister efficiently in a small space.

According to the above configuration (3), by the canister being arranged to be directed in the vehicle width direction, it is possible to more easily arrange the canister at the space in the front-to-rear direction between the engine and the exhaust pipe compared to a case in which the canister is arranged to be directed in the front-to-rear direction, and therefore, the layout efficiency is excellent.

According to the above configuration (4), by the canister being arranged at the position that is overlapped with the vehicle body right-to-left center line in the front view, the center of gravity approaches the center in the vehicle width direction, and therefore, the right-to-left balance of the vehicle is improved.

According to the above configuration (5), by further including the protection member that protects the canister, even when the canister is arranged in the vicinity of the exhaust pipe, it is possible to avoid being easily subject to a thermal impact.

According to the above configuration (6), by at least part of the canister being positioned at the space in the vertical direction between the lower end of the fender and the lower end of the cylinder, it is possible to guide the air from the frontward direction toward the cylinder by the canister, and therefore, the cooling efficiency of the cylinder is improved.

According to the above configuration (7), the protection member includes the slant part that is slanted such that the more rearward side is located at the higher position, and thereby, it is possible to protect the canister from thermal damage and to guide the air from the frontward direction toward the cylinder by the slant part.

According to the above configuration (8), by the opening part that is directed to the lower position of the oil cooler and that is directed to the upper part of the canister being provided on the fender, it is possible to guide the air that passes through the opening part to the upper part of the canister, and therefore, the cooling efficiency of the canister is improved. Additionally, it is possible to push up the air to the cylinder side by using the canister, and therefore, the cooling efficiency of the cylinder is further improved.

DESCRIPTION OF THE EMBODIMENTS

Figure 1:
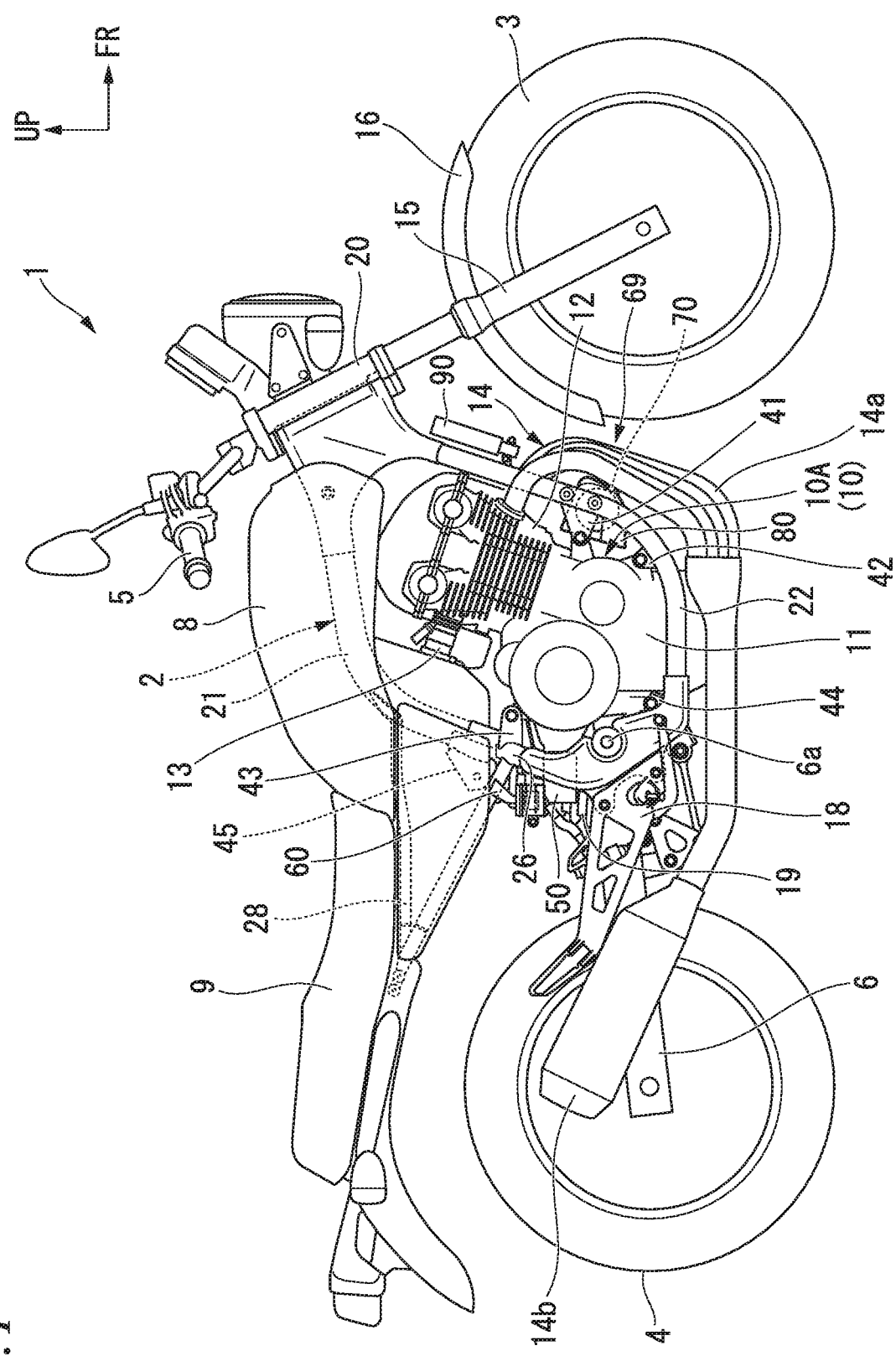
FIG. 1 is a right side view of a motorcycle in an embodiment of the present invention.

Hereinafter, an embodiment of the present invention will be described with reference to the drawings. Note that, front, rear, right, and left directions and the like in the following description are the same as front, rear, right, and left directions and the like in a vehicle described below if there is no particular description. In addition, in the drawings referred to in the following description, an arrow FR which indicates the front of the vehicle, an arrow LH which indicates the left of the vehicle, and an arrow UP which indicates the upside of the vehicle are shown.
<Entire Vehicle>
FIG. 1 shows a motorcycle 1 as an example of a saddle riding type vehicle. With reference to FIG. 1, the motorcycle 1 includes a front wheel 3 that is steered by a handle 5 and a rear wheel 4 that is driven by a power unit 10 including an engine. Hereinafter, the motorcycle may be simply referred to as a "vehicle".

A steering system component including the handle 5 and the front wheel 3 is steerably and pivotally supported by a head pipe 20 that is formed on a front end part of a vehicle body frame 2. For example, the handle 5 is a bar handle that is manufactured by bending one handle pipe made of a metal having a cylindrical shape. A handle steering shaft that is connected to the handle 5 is inserted through the head pipe 20. The power unit 10 is arranged at a middle part in a front-to-rear direction of the vehicle body frame 2. A swing arm 6 is arranged on a rearward side of the power unit 10. The swing arm 6 is pivotally supported swingably upward and downward around a pivot shaft 6a at a rear lower part of the vehicle body frame 2. A rear suspension 19 (hereinafter, referred to as a "cushion 19") is provided between a front part of the swing arm 6 and a rear part of the vehicle body frame 2.

For example, the vehicle body frame 2 is formed by integrally joining a plurality of types of steel materials by welding or the like. In the embodiment, the vehicle body frame 2 is a so-called mono-backbone double-cradle frame in which an engine is suspended by one main frame 21, and two downward tubes 22 are arranged from a front position to a lower position of the engine. Hereinafter, in the vehicle, a configuration element that is on the left side in the vehicle width direction may be given a sign "L", and a configuration element that is on the right side in the vehicle width direction may be given a sign "R".

Figure 2:
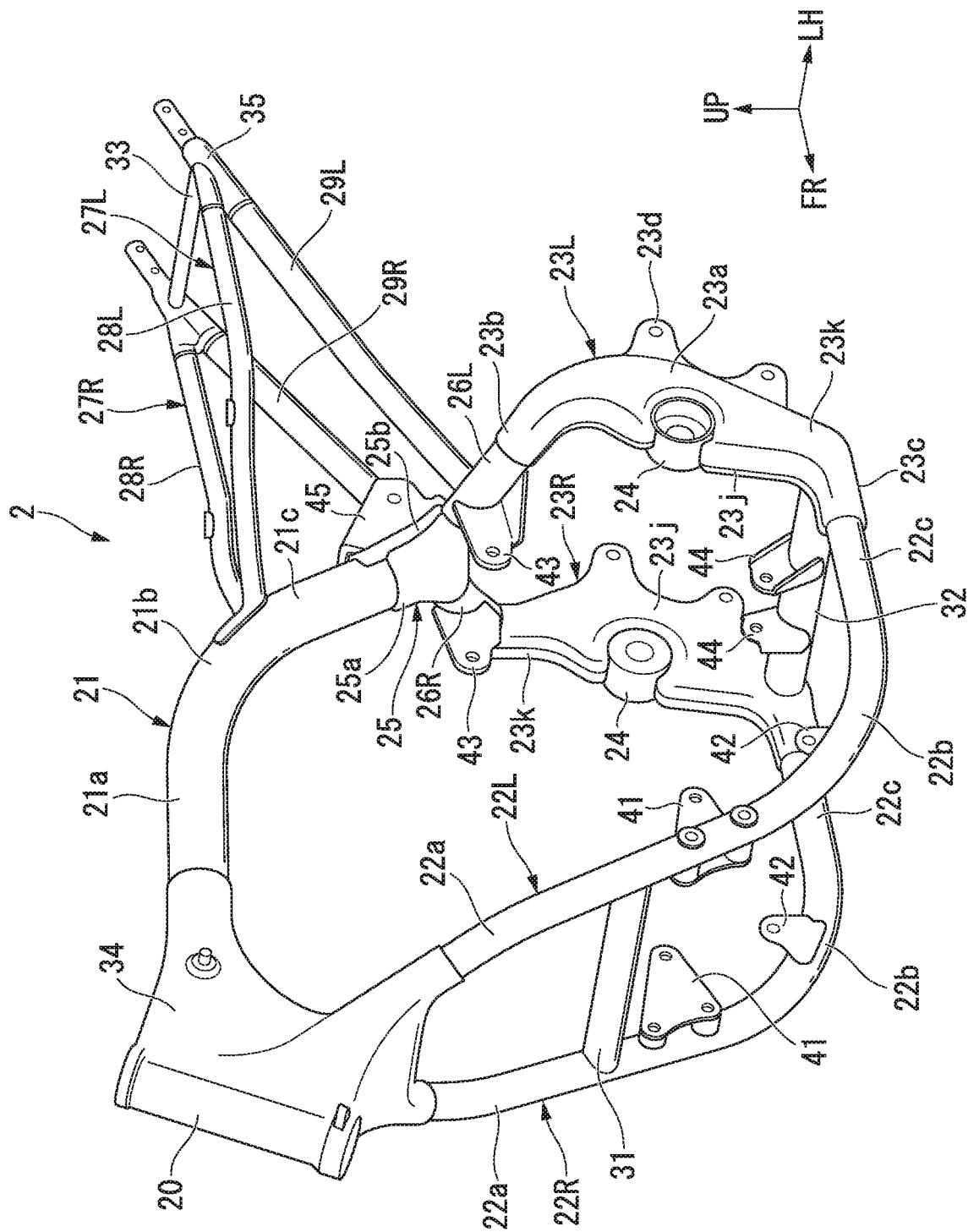
FIG. 2 is a perspective view of a vehicle body frame of the motorcycle.

As shown in FIG. 2, the vehicle body frame 2 includes: the head pipe 20 that is positioned at a front end of the vehicle body frame 2; one main frame 21 that extends rearwardly downward from an upper part of the head pipe 20 and is then curved rearward to extend; a pair of left and right downward tubes 22L, 22R that extend rearwardly downward with a steeper slant than the main frame 21 from a lower part of the head pipe 20 and are then curved downward to extend; a pair of left and right center frames 23L, 23R which extend downward from a rear part of the main frame 21 and on which a pivot part 24 (a shaft support part of the pivot shaft 6a) that rotatably supports a front end part of the swing arm 6 (refer to FIG. 1) is provided; a branch part 25 that branches toward the left and right center frames 23L, 23R from a rear part of the main frame 21; a pair of left and right connection pipes 26L, 26R that connect the branch part 25 and the center frame 23 together; a pair of left and right seat frames 27L, 27R that extend rearwardly upward from a rear upper end part of the main frame 21; a front cross member 31 that extends in a vehicle width direction so as to connect front parts of the left and right downward tubes 22L, 22R together; a lower cross member 32 that extends in the vehicle width direction so as to connect lower parts of the left and right center frames 23L, 23R together; and a rear cross member 33 that extends in the vehicle width direction so as to connect rear parts of the left and right seat frames 27L, 27R together.

As shown in FIG. 1, the power unit 10 includes a crankcase 11 and a cylinder 12 that protrudes frontwardly upward from a front part of the crankcase 11.

A front upper part of the crankcase 11 is attached to front parts of the right and left downward tubes 22 via a first engine hanger 41. A front lower part of the crankcase 11 is attached to curved parts (front lower curved part 22b, refer to FIG. 3) of the right and left downward tubes 22 via a second engine hanger 42. A rear upper part of the crankcase 11 is attached to the right and left connection pipes 26 via a third engine hanger 43. A rear lower part of the crankcase 11 is attached to the lower cross member 32 (refer to FIG. 3) via a fourth engine hanger 44.

An intake apparatus 13 and an exhaust apparatus 14 are connected to the cylinder 12. For example, the intake apparatus 13 includes a throttle body (not shown) that is connected to a rear wall of the cylinder 12, that communicates with an intake port, and that adjusts an air intake quantity and an air cleaner (not shown) that purifies the intake air to the throttle body and that performs intake of air to the power unit 10.

The exhaust apparatus 14 includes an exhaust pipe 14a that is connected to a front wall of the cylinder 12, that communicates with an exhaust port, and that extends rearwardly downward at a frontward position of the power unit 10 and is then bent to extend in a front-to-rear direction below the power unit 10 and a muffler 14b that is connected to a rear end of the exhaust pipe 14a and that extends diagonally rearwardly upward at a right side of the rear wheel 4.

A fuel tank 8 is attached to the main frame 21. A seat 9 that extends in the front-to-rear direction along a seat rail 28 is provided at a rearward position of the fuel tank 8 and above the seat rail 28.

In FIG. 1, each of a pair of right and left front forks 15 is arranged at each of right and left positions of the front wheel 3. A front fender 16 covers the front wheel 3 from an upside. An ABS modulator (braking force adjustment apparatus) 50 performs an ABS control in a vehicle that employs an Anti-lock Brake System (hereinafter, referred to as an "ABS"). A stay 60 supports the ABS modulator.

<Vehicle Body Frame Detail>

Figure 3:
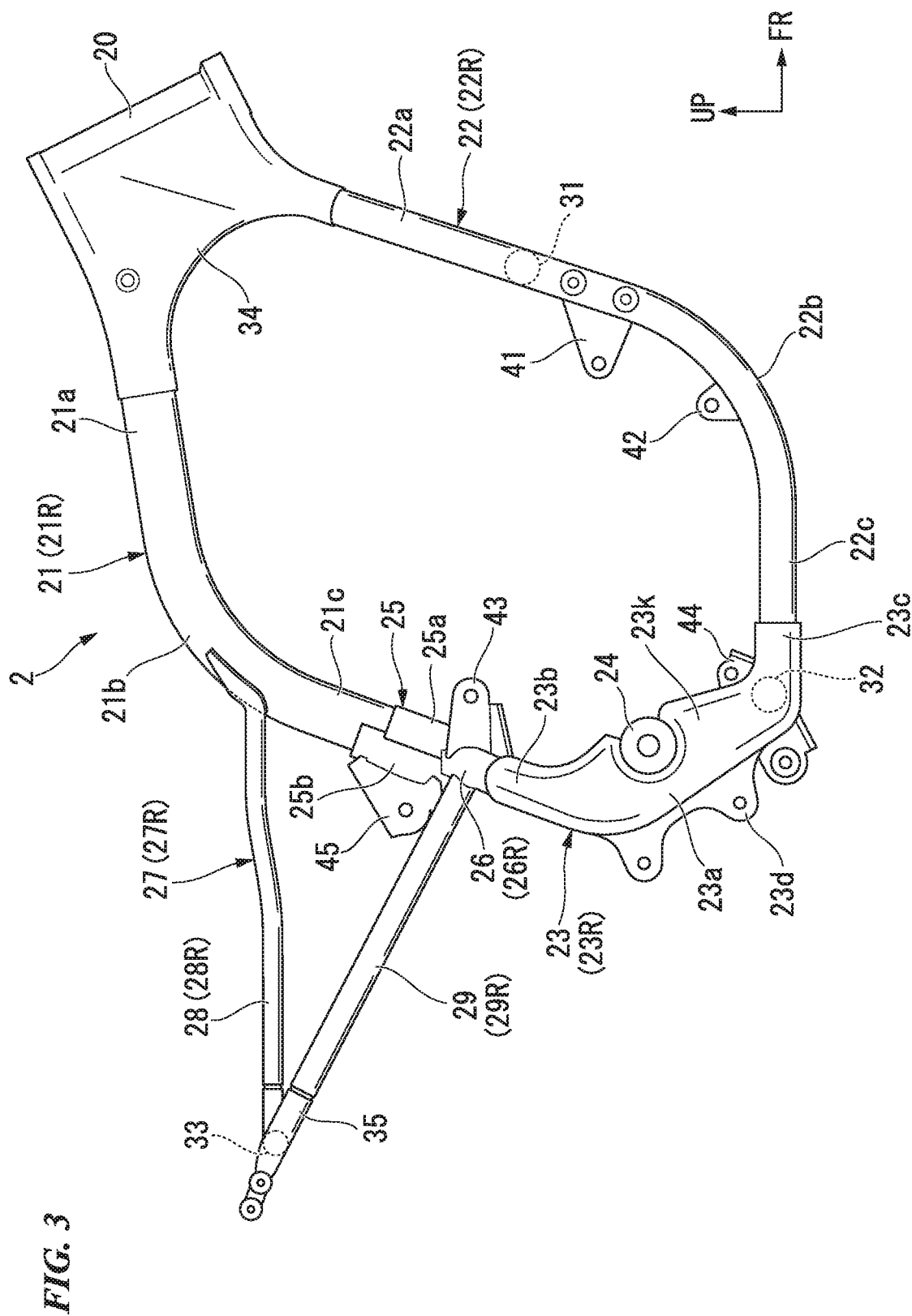
FIG. 3 is a right side view of the vehicle body frame.

In a side view of FIG. 3, the vehicle body frame 2 includes: the head pipe 20 that has a cylindrical shape and extends in the vertical direction to be slanted such that a more front side is located at a lower position; the one main frame 21 that extends rearwardly downward from the head pipe 20 and is then curved downward to extend; the pair of right and left downward tubes 22 that extend rearwardly downward with a steeper slant than the main frame 21 from the head pipe 20 and are then curved rearward to extend; the pair of right and left center frames 23 which extend downward from the rear part of the main frame 21 and on which the pivot part 24 that rotatably supports the front end part of the swing arm 6 (refer to FIG. 1) is provided; the branch part 25 that branches toward the right and left center frames 23 from the rear part of the main frame 21; the pair of right and left connection pipes 26 that connect the branch part 25 and the center frame 23 together; the pair of right and left seat frames 27 that extend rearwardly upward from the rear upper end part of the main frame 21; the front cross member 31 that extends in the vehicle width direction so as to connect the front parts of the right and left downward tubes 22 together; the lower cross member 32 that extends in the vehicle width direction so as to connect the lower parts of the right and left center frames 23 together; the rear cross member 33 that extends in the vehicle width direction so as to connect the rear parts of the right and left seat frames 27 together; a front gusset 34 that is connected to a front part of the main frame 21, front parts of the right and left downward tubes 22, and the head pipe 20; and a rear gusset 35 that is connected to rear parts of the right and left seat frames 27 and the rear cross member 33.

For example, among configuration elements of the vehicle body frame 2, the head pipe 20, the main frame 21, the downward tube 22, the connection pipe 26, the seat frame 27, the front cross member 31, the lower cross member 32, the rear cross member 33 are constituted of a round steel pipe. Each of the head pipe 20 and the main frame 21 is constituted of each of round steel pipes having substantially the same diameter. The main frame 21 is constituted of a round steel pipe having a slightly larger diameter than the downward tube 22. Each of the downward tube 22, the connection pipe 26, the front cross member 31, and the lower cross member 32 are constituted of each of round steel pipes having substantially the same diameter. The seat frame 27 and the rear cross member 33 are constituted of a round steel pipe having a slightly smaller diameter than the downward tube 22.

<Main Frame>

In a side view of FIG. 3, the main frame 21 includes a main frame front-half part 21a that extends to be slanted moderately rearwardly downward from an upper part of the head pipe 20, a rearwardly upward curved part 21b that continues to a rear end of the main frame front-half part 21a and that forms a curved shape protruding rearwardly upward, and a main frame rear-half part 21c that continues to a rear end of the rearwardly upward curved part 21b and that extends to be slanted more steeply than the main frame front-half part 21a. The main frame front-half part 21a, the rearwardly upward curved part 21b, and the main frame rear-half part 21c are constituted of a monolithic round steel pipe.

Figure 4:
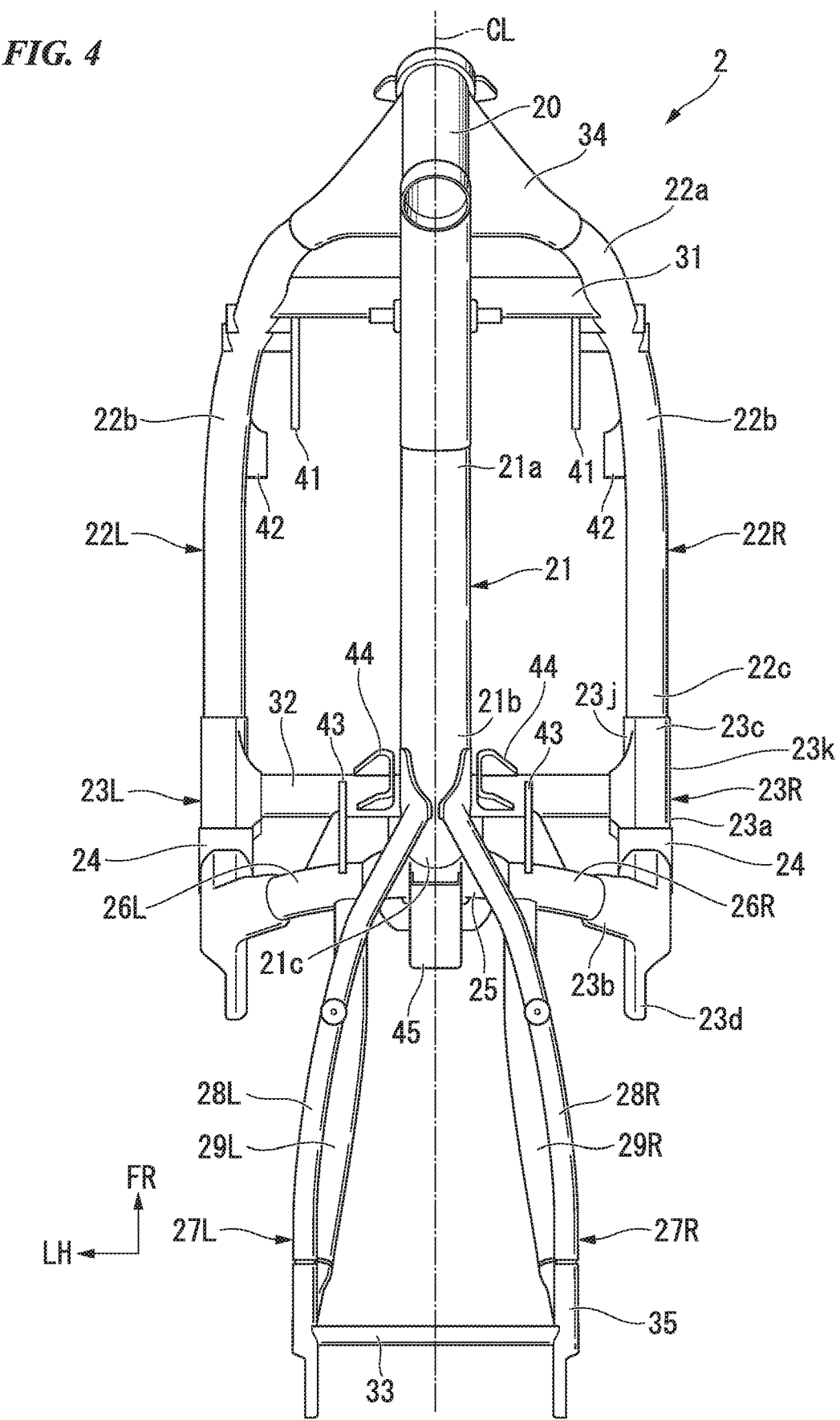
FIG. 4 is a top view of the vehicle body frame.

In a top view of FIG. 4, the main frame 21 extends linearly in the front-to-rear direction along a vehicle body right-to-left center line CL.

<Downward Tube>

In a side view of FIG. 3, the downward tube 22 includes a downward tube front-half part 22a that extends to be slanted more steeply than the main frame front-half part 21a from a lower part of a connection part of the main frame 21 in the head pipe 20, a frontwardly downward curved part 22b that continues to a rear end of the downward tube front-half part 22a and that forms a curved shape protruding frontwardly downward, and a downward tube rear-half part 22c that continues to a rear end of the frontwardly downward curved part 22b and that extends rearward. The downward tube front-half part 22a, the frontwardly downward curved part 22b, and the downward tube rear-half part 22c are constituted of a monolithic round steel pipe.

In a top view of FIG. 4, the left and right downward tubes 22L, 22R extend diagonally from the head pipe 20 such that a more rearward side is located at a more outside position in the vehicle width direction, are then bent at the front lower curved part 22b, and extend rearward substantially in parallel with the vehicle body side surface.

Figure 5:
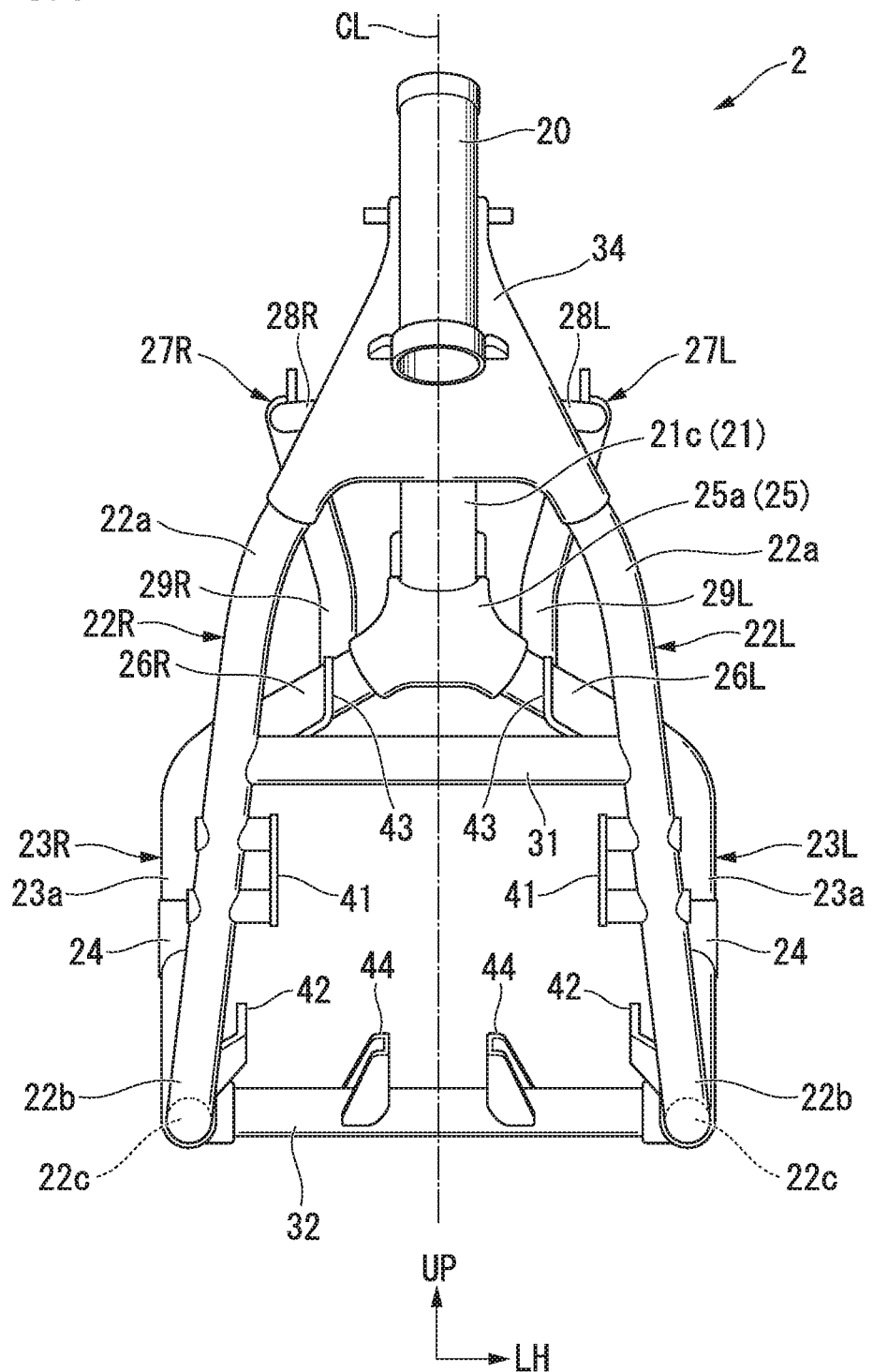
FIG. 5 is a front view of the vehicle body frame.

In a front view of FIG. 5, each of the left and right downward tubes 22L, 22R is located at a more inside position in the vehicle width direction than the outside surface in the vehicle width direction of each of the left and right center frames 23L, 23R. In a front view of FIG. 5, the front cross member 31 that bridges a space in the vehicle width direction between the right and left downward tube front-half parts 22a is provided between lower portions of the right and left downward tube front-half parts 22a. The front cross member 31 extends so as to form a linear shape along the vehicle width direction. For example, the front cross member 31 is joined by welding to the right and left downward tube front-half parts 22a.

As shown in FIG. 2, the first engine hanger 41 is provided to protrude rearward on a lower end portion of the right and left downward tube front-half parts 22a. The first engine hanger 41 is provided in a lower region of a connection part of the front cross member 31 in the right and left downward tube front-half parts 22a. For example, the first engine hanger 41 is joined by bolt fastening to the downward tube front-half part 22a.

The second engine hanger 42 is provided to protrude upward on the frontwardly downward curved part 22b of the right and left downward tubes 22. For example, the second engine hanger 42 is joined by welding to the frontwardly downward curved part 22*b*.

<Center Frame>

In a side view of FIG. 3, the center frame 23 includes: a center frame main body 23*a* which extends to be slanted such that a more front side is located at a lower position and on which the pivot part 24 is provided at a recess portion of a front upper part; an upper connection part 23*b* that extends frontwardly upward from an upper end of the center frame main body 23*a* and that is connected to the connection pipe 26; a lower connection part 23*c* that extends frontward from a lower end of the center frame main body 23*a* and that is connected to the downward tube 22; and a bracket connection part 23*d* which protrudes rearwardly downward from a rear end of the center frame main body 23*a* and to which a step bracket 18 (refer to FIG. 1) is connected. The center frame main body 23*a*, the upper connection part 23*b*, the lower connection part 23*c*, and the bracket connection part 23*d* are integrally formed of the same member.

As shown in FIG. 2, the center frame 23 includes an inner half body 23*j* that is positioned at the inside in the vehicle width direction and an outer half body 23*k* that is positioned at the outside in the vehicle width direction. For example, the inner half body 23*j* and the outer half body 23*k* are integrally joined to each other by welding.

The outer half body 23*k* is joined to the inner half body 23*j* from the outside in the vehicle width direction. The inner half body 23*j* and the outer half body 23*k* are joined together, and thereby, the right and left center frames 23 form a closed annular shape elongated in the front-to-rear direction in a cross-sectional view (cross-sectional view cut by a horizontal plane). That is, the right and left center frames 23 are hollow members having a closed cross-sectional structure.

In a front view of FIG. 5, outside surfaces in the vehicle width direction of the right and left center frame main bodies 23*a* form an outer end surface in the vehicle width direction of the vehicle body frame 2.

In a top view of FIG. 4, the pair of right and left upper connection parts 23*b* are curved toward the inside in the vehicle width direction from an upper end of the center frame main body 23*a* along the slant of the connection pipe 26.

In a front view of FIG. 5, the lower cross member 32 that bridges a space in the vehicle width direction between the right and left center frame main bodies 23*a* is provided between lower end portions of the right and left center frame main bodies 23*a*. The lower cross member 32 forms a linear shape along the vehicle width direction. For example, the lower cross member 32 is joined by welding to the right and left center frame main bodies 23*a*.

A pair of right and left fourth engine hangers 44 is provided to stand frontwardly upward on the lower cross member 32. For example, the fourth engine hanger 44 is joined by welding to the lower cross member 32.

<Branch Part>

In a front view of FIG. 5, the branch part 25 forms a trident shape that branches to the upside, the left side in the vehicle width direction, and the right side in the vehicle width direction. The branch part 25 connects a lower end portion of the main frame rear-half part 21*c* and inner end parts in the vehicle width direction of the left and right connection pipes 26L, 26R together. As shown in FIG. 2, the branch part 25 includes a branch front-half portion 25*a* that covers a joint (hereinafter, also referred to as a "three-point joint") among a lower end portion of the main frame rear-half part 21*c* and inner end portions in the vehicle width direction of the right and left connection pipes 26 from a frontwardly downward direction and a branch rear-half portion 25*b* that covers the three-point joint from a rearwardly upward direction. For example, the branch front-half portion 25*a* and the branch rear-half portion 25*b* are integrally joined to each other by welding.

A cushion upper support part 45 that supports an upper end part of the cushion 19 (refer to FIG. 1) is provided on a rear portion of the branch part 25. In a side view of FIG. 3, the cushion upper support part 45 protrudes rearward. In a side view of FIG. 3, the cushion upper support part 45 is arranged at a space in the vertical direction between the seat rail 28 and a support pipe 29. For example, the cushion upper support part 45 is joined to the branch rear-half portion 25*b* by welding.

<Connection Pipe>

In a front view of FIG. 5, the left and right connection pipes 26L, 26R extend linearly from an outer end in the vehicle width direction of the branch part 25 such that the more outer side in the vehicle width direction is located at a lower position.

As shown in FIG. 2, the third engine hanger 43 is provided to protrude frontward on the left and right connection pipes 26L, 26R. For example, the third engine hanger 43 is joined to the left and right connection pipes 26L, 26R by welding.

<Seat Frame>

In a side view of FIG. 3, the right and left seat frames 27 include the seat rail 28 that extends rearward from the rearwardly upward curved part 21*b* of the main frame 21 and the support pipe 29 that extends to be slanted rearwardly upward from the connection pipe 26.

In a top view of FIG. 4, the left and right seat rails 28L, 28R extend from the rearwardly upward curved part 21*b* of the main frame 21 to be slanted such that the more rearward side is located at the more outer position in the vehicle width direction, and are then curved rearward to extend.

In a top view of FIG. 4, the left and right support pipes 29L, 29R extend linearly rearward from the connection pipe 26 and then extend to be slanted such that the more rearward side is located at the more outer position in the vehicle width direction. Each of rear end parts of the left and right support pipes 29L, 29R is joined to each of rear end parts of the left and right seat rails 28L, 28R.

In a top view of FIG. 4, the rear cross member 33 that bridges a space in the vehicle width direction between the left and right seat frames 27L, 27R is provided between rear end portions of the left and right seat frames 27L, 27R. The rear cross member 33 forms a linear shape along the vehicle width direction. For example, the rear cross member 33 is joined by welding to the left and right seat frames 27L, 27R.

<Canister Arrangement Structure>

As shown in FIG. 1, a canister arrangement structure 69 is provided on a front part of the vehicle.

The canister arrangement structure 69 includes: an engine 10A that includes the crankcase 11; the exhaust pipe 14*a* that extends downward at a frontward position of the crankcase 11 from a front part of the engine 10A and then passes below the engine 10A; the pair of right and left downward tubes 22 that extend downward from the head pipe 20; the front fender 16 (hereinafter, referred to as a "fender 16") that covers the front wheel 3 from the upside; an oil cooler 90 that is located at a frontward position of the cylinder 12 of the engine 10A; the canister 70 that recovers an evaporated fuel which is generated at the fuel tank 8; and a protection member 80 that protects the canister 70.

The engine 10A is a parallel four-cylinder engine in which a crankshaft is directed along the vehicle width direction. The engine 10A includes the crankcase 11 and the cylinder 12 that protrudes upward from the crankcase 11. The cylinder 12 protrudes frontwardly upward from the front part of the crankcase 11. The cylinder 12 is a frontward tilted cylinder that is slightly tilted frontward with respect to a vertical line. An intake pipe that includes a throttle body and the like of each cylinder is connected to the rear side of the engine 10A. A base end of a single exhaust pipe in the exhaust apparatus 14 of each cylinder is connected to the front side of the engine 10A.

Figure 11:
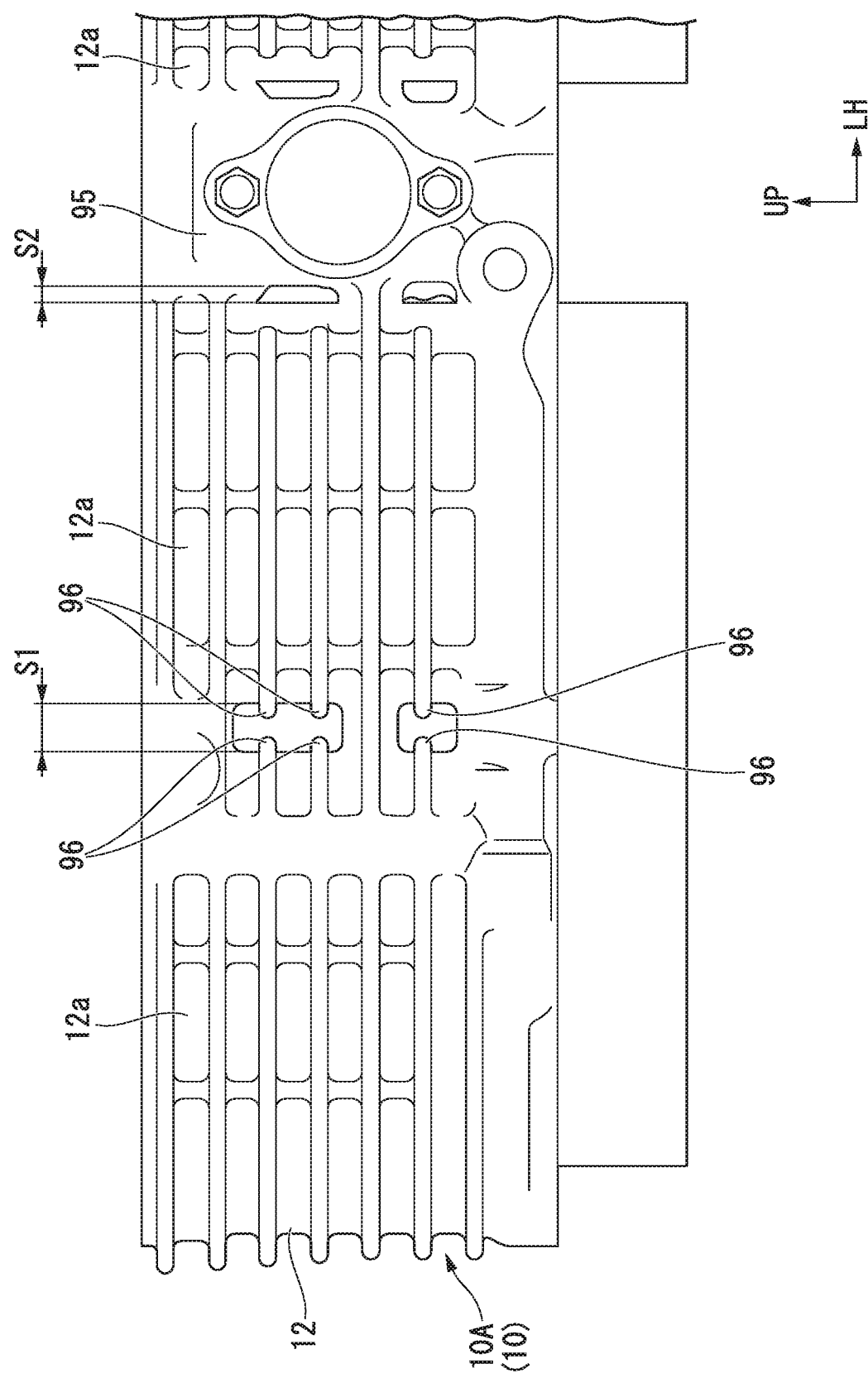
FIG. 11 is an enlarged view of a main part of a cylinder of the motorcycle.

In a front view of FIG. 11, a spacing S1 between two cylinders 12a that are adjacent in the vehicle width direction in the cylinder 12 is larger than a spacing S2 between the cylinder 12a and a chain cover 95 that are adjacent in the vehicle width direction (S1>S2).

As shown in FIG. 11, a fin 96 may be provided between the two cylinders 12a that are adjacent in the cylinder 12. The fin 96 protrudes toward each of side surfaces of the cylinders 12a that face each other. A plurality of fins 96 are provided on each cylinder 12a to be spaced in the vertical direction. For example, the plurality of fins 96 are integrally formed of the same member as the cylinder 12.

In a side view of FIG. 1, the exhaust apparatus 14 includes four single exhaust pipes 141 to 144 (refer to FIG. 6) that are connected to the front wall of the cylinder 12, that communicate with the exhaust port, and that extend rearwardly downward at the frontward position of the crankcase 11 and are then bent rearward, a catalyst pipe 145 (refer to FIG. 6) that is connected to the four single exhaust pipes 141 to 144 and that accommodates a catalyst for exhaust air purification at the inside, and the muffler 14b that is connected to the catalyst pipe 145 and that silences and externally discharges exhaust gas. The four single exhaust pipes 141 to 144 and the catalyst pipe 145 constitute the exhaust pipe 14a. In a side view of FIG. 1, the exhaust pipe 14a extends toward a frontward position of the right and left downward tubes 22 from a front part of the engine 10A and is then bent to extend downward.

Figure 7:
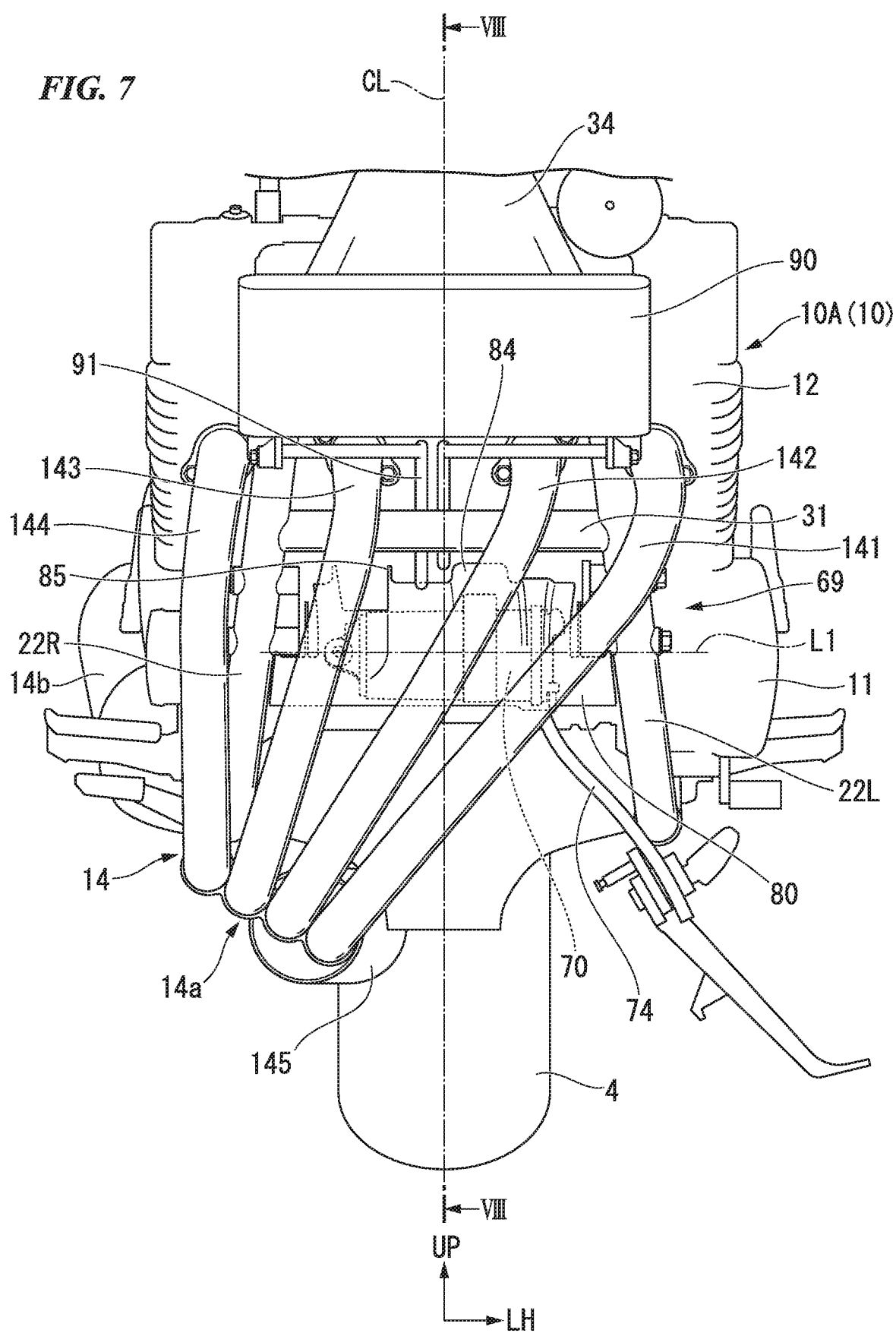
FIG. 7 is a front view of the canister arrangement structure.

In a front view of FIG. 7, among the four single exhaust pipes 141 to 144, each of upstream-side end parts of two single exhaust pipes 141, 144 on the outer side in the vehicle width direction is located at each of outside positions in the vehicle width direction of the left and right downward tubes 22L, 22R. The one single exhaust pipe 144 that is located at the rightmost position is arranged so as to pass through the outside position in the vehicle width direction of the right downward tube 22R. The two single exhaust pipes 142, 143 that are located at a middle position in the vehicle width direction are arranged so as to pass through a space in the vehicle width direction between the left and right downward tubes 22L, 22R.

In a front view of FIG. 7, in upstream parts (more upstream parts than a converging connection part) of the four single exhaust pipes 141 to 144 that extend downward at the front position of the crankcase 11, adjacent two single exhaust pipes are arranged to be spaced in the vehicle width direction. In a front view of FIG. 7, the spacing between adjacent two single exhaust pipes becomes narrower at a more downstream side.

In a front view of FIG. 7, downstream-side end parts of the four single exhaust pipes 141 to 144 gather at a more right side than the vehicle body right-to-left center line CL and are connected to the catalyst pipe 145 below the engine 10A. The catalyst pipe 145 extends rearward from the converging connection part of the four single exhaust pipes 141 to 144 below the engine 10A and at the right side in the vehicle width direction. The muffler 14b extends diagonally upward and rearward from a right side part of the vehicle body.

Figure 8:
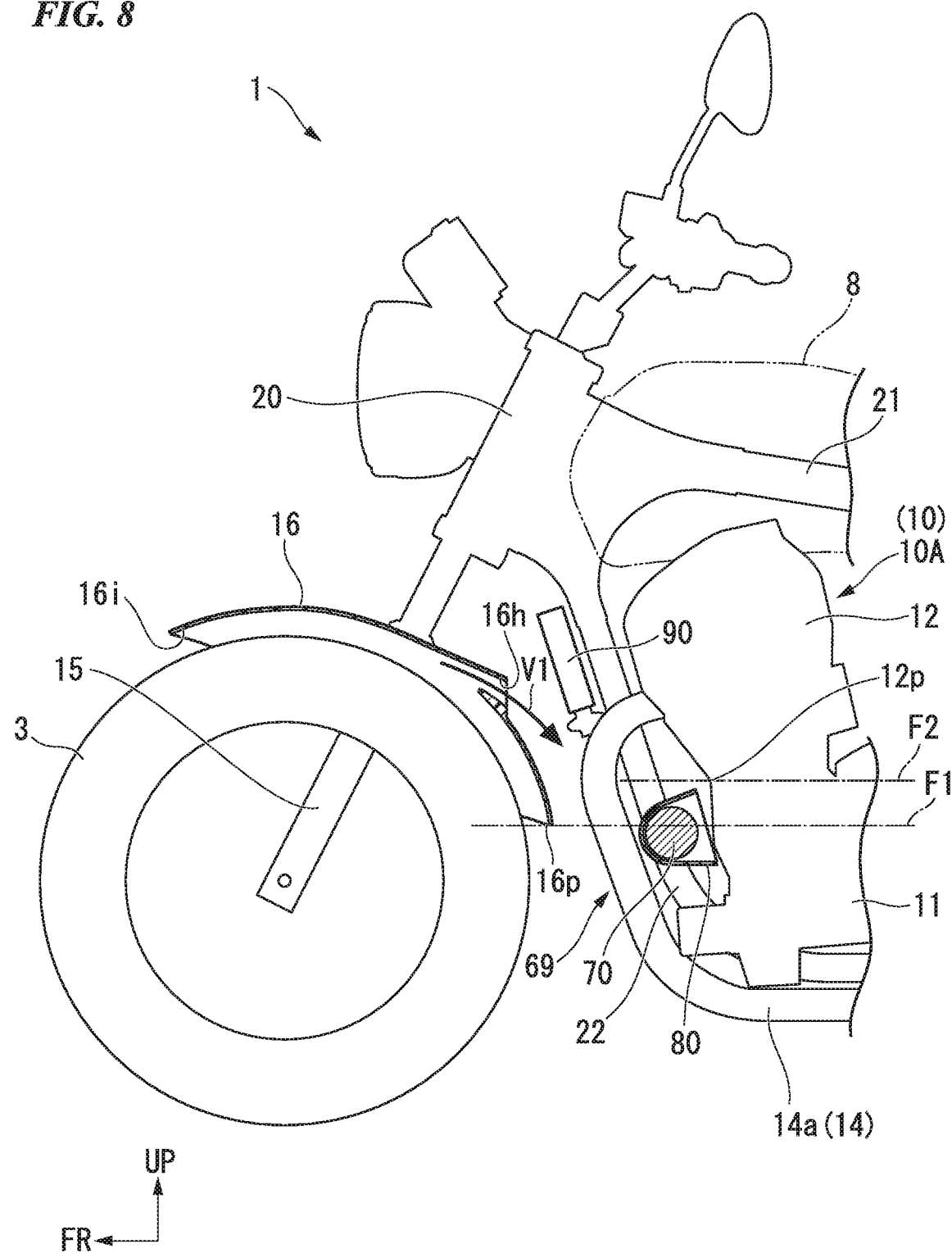
FIG. 8 is a left side view of the canister arrangement structure including a VIII-VIII cross-section of FIG. 7.

As shown in FIG. 8, the fender 16 covers a rear upper part of the front wheel 3 from a rearwardly upward direction. In a cross-sectional view of FIG. 8, the fender 16 has an outer shape along a rear upper surface of the front wheel 3. In a cross-sectional view of FIG. 8, an inner surface of the fender 16 is arranged to be spaced from an outer circumferential surface of the front wheel 3. For example, the fender 16 is fixed to the front fork 15 by a fastening member such as a bolt.

An opening part 16h that is directed to a lower position of the oil cooler 90 and that is directed to an upper part of the canister 70 is provided on the fender 16. Air (travel wind) that is introduced from a front opening 16i of the fender 16 passes through the opening part 16h and flows toward the upper part of the canister 70. An arrow V1 in FIG. 8 indicates a flow direction of the air that passes through the opening part 16h.

For example, an opening variable member (not shown) that is capable of changing an opening area of the opening part 16h may be provided on the fender 16. Thereby, it is possible to adjust the amount of air that is directed toward the upper part of the canister 70.

As shown in FIG. 7, the oil cooler 90 forms a cuboid shape elongated in the vehicle width direction. In a side view of FIG. 8, the oil cooler 90 is arranged to be slightly tilted frontward with respect to the vertical line. In a front view of FIG. 7, the oil cooler 90 is arranged above the front cross member 31. In a front view of FIG. 7, the length in the vehicle width direction of the oil cooler 90 is longer than the length in the vehicle width direction between upper parts of the left and right downward tubes 22L, 22R. In a front view of FIG. 7, the center in the vehicle width direction of the oil cooler 90 is arranged at a position that is overlapped with the vehicle body right-to-left center line CL. For example, the oil cooler 90 is fixed to the left and right downward tubes 22L, 22R via a bracket by a fastening member such as a bolt. In FIG. 7, a pipe 91 extends toward the vehicle body side from a lower part of the oil cooler 90.

<Canister>

Figure 10:
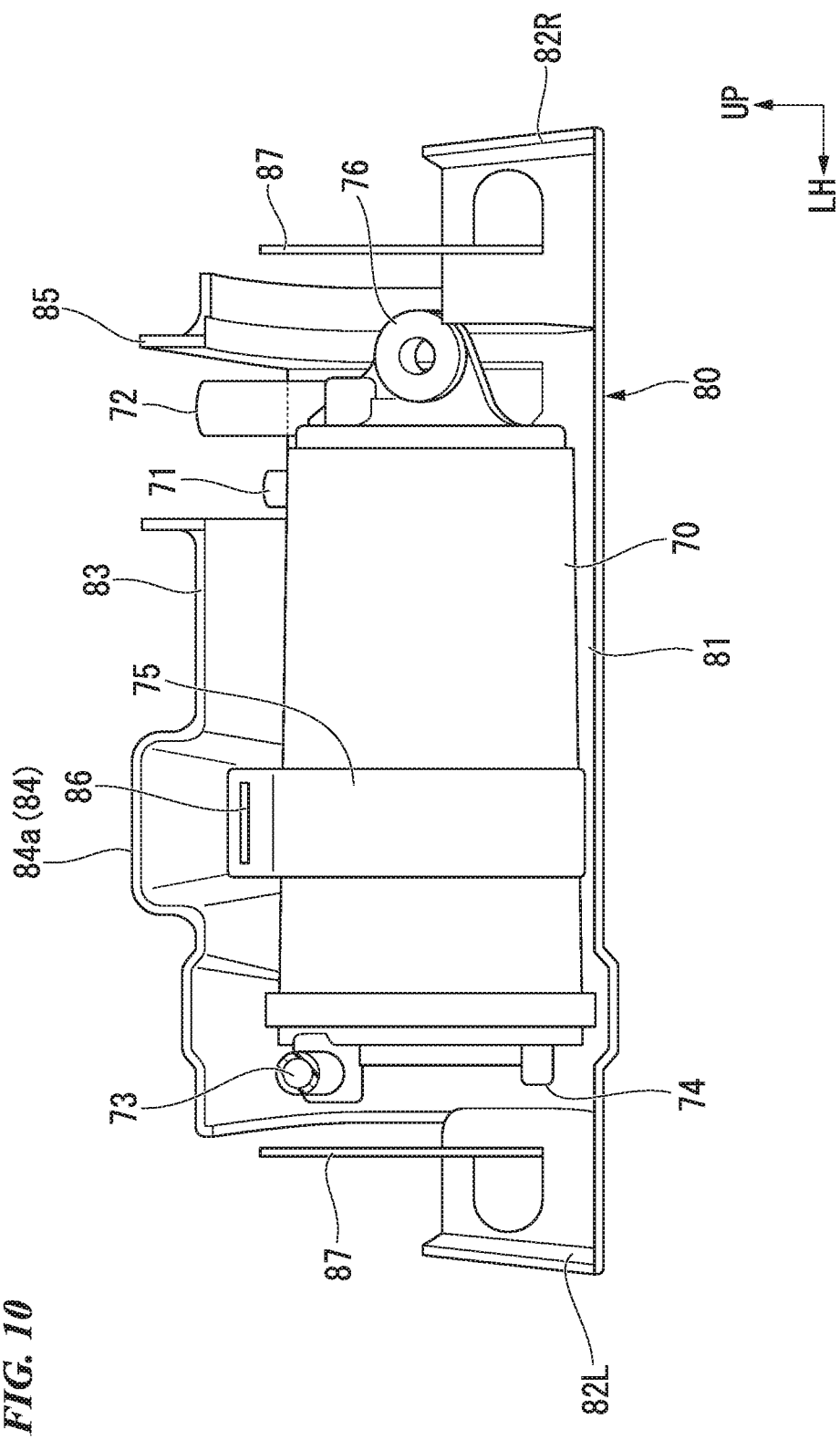
FIG. 10 is a rear view of the canister and the protection member.

As shown in FIG. 8, the canister 70 is arranged between the engine 10A and the exhaust pipe 14a at a frontward position of the crankcase 11. As shown in FIG. 10, a charge pipe 71 that is connected to an oil supply pipe of the fuel tank 8 (refer to FIG. 8), a purge pipe 72 that allows the canister 70 and the throttle body of the engine air intake system to communicate with each other, an air introduction pipe 73 that makes it possible to introduce air to the inside of the canister 70, and a drain pipe 74 that makes it possible to discharge the fuel, water droplet, and the like that are accumulated inside the canister 70 are connected to the canister 70.

As shown in FIG. 7, the canister 70 is arranged at a space in the vehicle width direction between the left and right downward tubes 22L, 22R. For example, the canister 70 is fixed to the left and right downward tubes 22 via a bracket by a fastening member such as a bolt. In a front view of FIG. 7, the canister 70 is arranged below the front cross member 31. In a front view of FIG. 7, the canister 70 is arranged at a position that is overlapped with three single exhaust pipes 141 to 143 from the left side among the four single exhaust pipes 141 to 144.

In a front view of FIG. 7, the canister 70 is arranged to be directed in the vehicle width direction. The canister 70 forms a column shape that extends in the vehicle width direction. In a front view of FIG. 7, a central axis L1 (hereinafter, referred to as a "canister axis L1") of the canister 70 extends along the vehicle width direction.

In a front view of FIG. 7, the canister 70 is arranged at a position that is overlapped with the vehicle body right-to-left center line CL. In a front view of FIG. 7, the center in the vehicle width direction of the canister 70 is arranged at a position that is overlapped with the vehicle body right-to-left center line CL.

As shown in FIG. 8, an upper part of the canister 70 is positioned at a space in the vertical direction between a lower end 16p of the fender 16 and a lower end 12p of the cylinder 12. In FIG. 8, a first virtual horizontal plane F1 is a plane in parallel with a horizontal plane that passes through the lower end 16p of the fender 16, and a second virtual horizontal plane F2 is a plane in parallel with a horizontal plane that passes through the lower end 12p of the cylinder 12. In a side view of FIG. 8, the upper part of the canister 70 is positioned at a space in the vertical direction between the first virtual horizontal plane F1 and the second virtual horizontal plane F2.

<Protection Member>

As shown in FIG. 8, the protection member 80 covers the canister 70 so as to block heat from the exhaust pipe 14a. In a cross-sectional view of FIG. 8, the cross-sectional shape of the protection member 80 forms a U shape having a protrusion on the exhaust pipe 14a side. The protection member 80 covers most of the canister 70 excluding a rear part from the outside of the canister 70.

Figure 9:
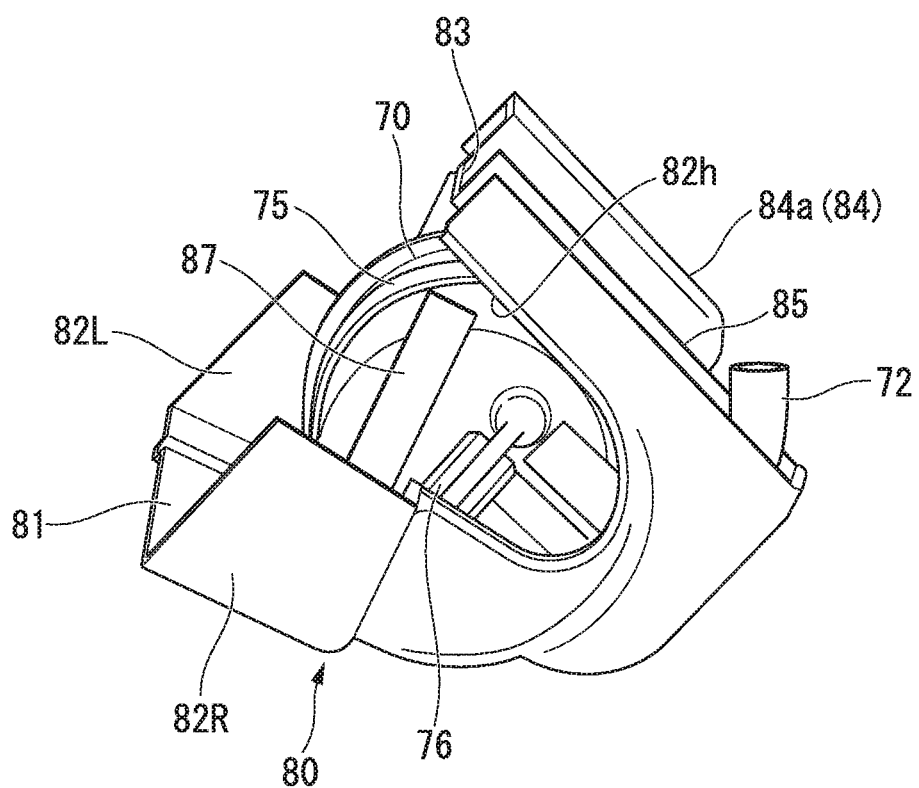
FIG. 9 is a perspective view of the canister and a protection member.
Figure 9:

As shown in FIG. 9, the protection member 80 includes a cover main body 81 that covers the entirety in the vehicle width direction of the canister 70 from a front upper part to a rear lower part of the canister 70 and a pair of left and right cover side walls 82L, 82R that continue to an outer end in the vehicle width direction of the cover main body 81 and that cover the outer side part in the vehicle width direction of the canister 70. The cover main body 81 and the left and right cover side walls 82L, 82R are integrally formed by the same member.

The cover main body 81 includes a slant part 83 that is slanted such that a more rearward side is located at a higher position. The slant part 83 is a part of the cover main body 81, wherein the part of the cover main body 81 covers a front upper part of the canister 70. A protrusion portion 84 that protrudes frontwardly upward with respect to the cover main body 81 so as to form an arrangement space of a connection part (hereinafter, referred to as a "support member connection part") between a support member 75 and a canister support part 86 (refer to FIG. 10) is provided on the slant part 83. The protrusion portion 84 covers the support member connection part from the frontwardly upward direction. A slant surface 84a of the protrusion portion 84 forms a flat surface that is linearly slanted such that a more rearward side is located at a higher position.

A pipe conduit formation part 85 that forms an arrangement space of the charge pipe 71 and the purge pipe 72 is provided on the cover main body 81. A front upper end of the pipe conduit formation part 85 is slanted along the slant surface 84a of the protrusion portion 84 such that a more rearward side is located at a higher position. In FIG. 9, the support member 75 is wound around an outer circumferential surface of the canister 70. For example, the support member 75 is formed of an elastic member such as a rubber. As shown in FIG. 10, the canister support part 86 that supports the canister 70 via the support member 75 is provided on the cover main body 81.

Figure 6:
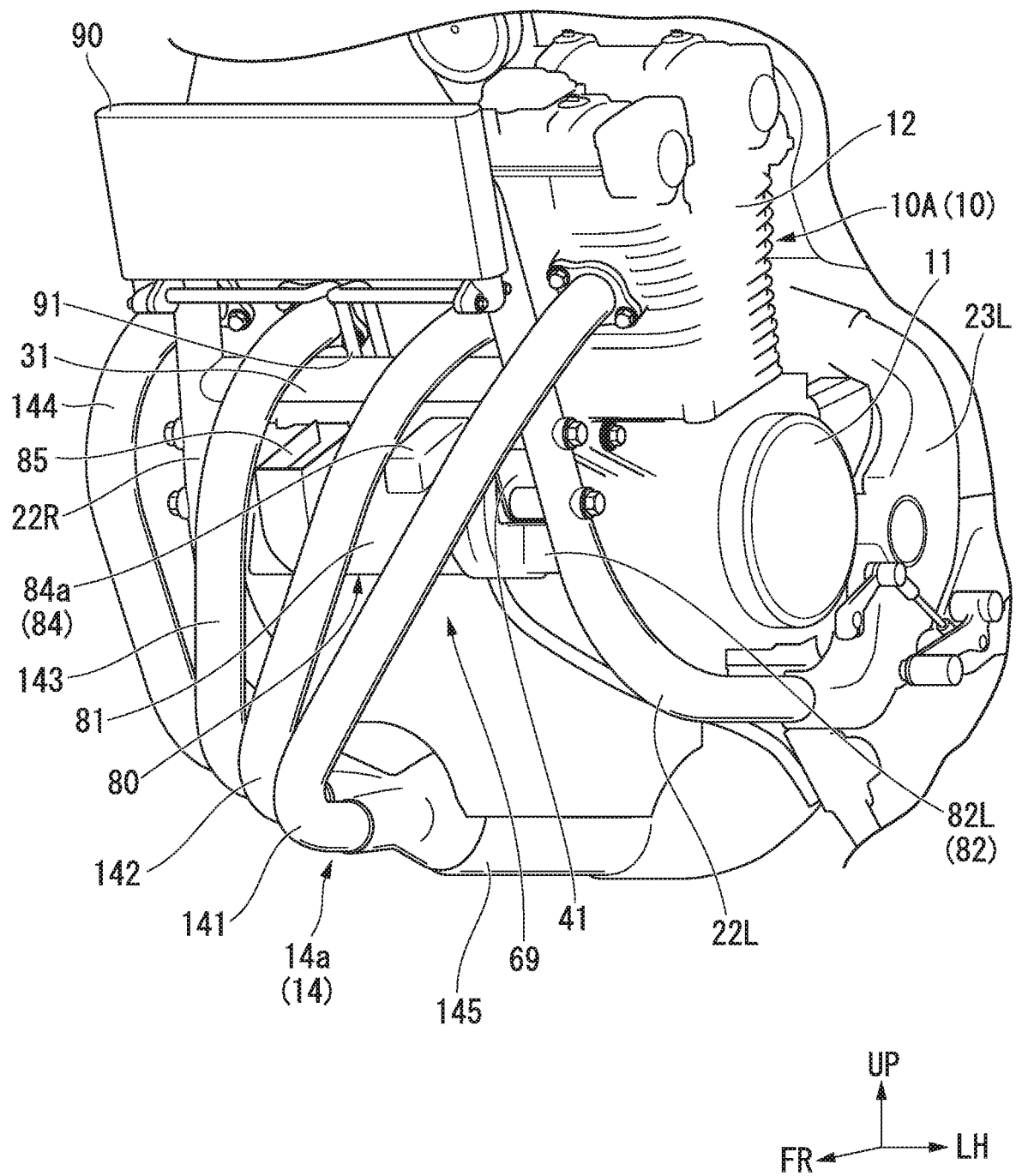
FIG. 6 is a perspective view of a canister arrangement structure of the motorcycle.

As shown in FIG. 9, an opening 82h (hereinafter, also referred to as a "U opening 82h") having a U shape that protrudes frontwardly downward is provided on the left and right cover side walls 82L, 82R. A portion of the outside part in the vehicle width direction of the canister 70 is externally exposed via the U opening 82h. The U opening 82h in the left and right cover side walls 82L, 82R functions as an arrangement space of a connection member for connecting the canister 70 and the protection member 80 to the vehicle body side. As shown in FIG. 6, each of the U openings 82h in the left and right cover side walls 82L, 82R is covered by each of the left and right first engine hangers 41 from the outward direction in the vehicle width direction.

The protection member 80 is fixed to the left and right downward tubes 22L, 22R (refer to FIG. 7) via a connection member including a bracket 87. The bracket 87 forms an L shape that is formed by bending a plate member. As shown in FIG. 9, the bracket 87 extends linearly to be slanted such that a more frontward side is located at a higher position from a bent part. A front upper part of the bracket 87 is externally exposed via the U opening 82h. For example, one end part of the bracket 87 is fixed to the left and right cover side walls 82L, 82R by welding. For example, the other end part of the bracket 87 is fixed to the connection member (not shown) by welding. In FIG. 9, a rubber bush 76 constitutes a connection member of the canister 70.

<Flow of Travel Wind>

An operation of the canister arrangement structure 69 according to the embodiment is described.

Figure 12:
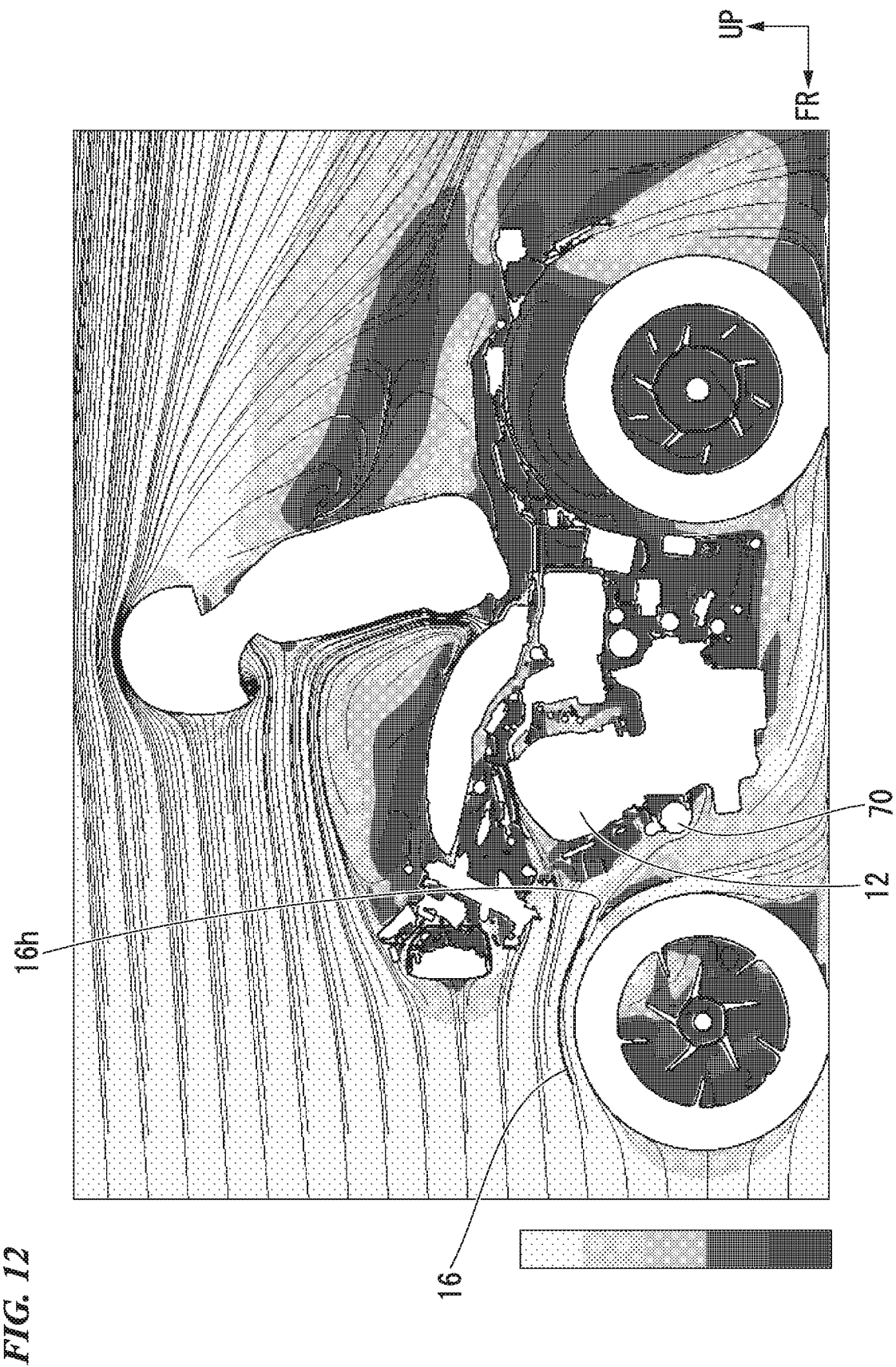
FIG. 12 is a view showing an operation of the canister arrangement structure.

FIG. 12 is a left side view showing a flow of travel wind according to the embodiment. In FIG. 12, a part (a part in which a hatching is light) in which dots are relatively sparse indicates a part in which the speed of wind (the amplitude of the speed of the travel wind) is larger compared to a part (a part in which a hatching is dark) in which dots are relatively dense.

As shown in FIG. 12, in the embodiment, the travel wind passes through the opening part 16h of the fender 16 and flows toward the canister 70. The travel wind passes through the opening part 16h and maintains a high speed of wind in the vicinity of the canister 70. Thereby, it is possible to improve the cooling efficiency of the canister 70.

In the embodiment, the canister 70 is positioned at a space in the vertical direction between the lower end of the fender 16 and the lower end of the cylinder 12 (refer to FIG. 8), and therefore, the travel wind flows toward the cylinder 12 by the canister 70. Additionally, the travel wind flows toward the cylinder 12 by the slant part 83 (refer to FIG. 9) of the protection member 80. Thereby, it is possible to improve the cooling efficiency of the cylinder 12.

As described above, the above embodiment is the canister arrangement structure 69 of the motorcycle 1 including: the engine 10A that includes the crankcase 11; the exhaust pipe 14a that extends downward at the frontward position of the crankcase 11 from the front part of the engine 10A and then passes below the engine 10A; and the canister 70 that recovers the evaporated fuel which is generated at the fuel tank 8, wherein the canister 70 is arranged between the engine 10A and the exhaust pipe 14a at the frontward position of the crankcase 11.

According to this configuration, the canister 70 is arranged between the engine 10A and the exhaust pipe 14a at the frontward position of the crankcase 11, and thereby, it is possible to effectively use the space in the front-to-rear direction between the engine 10A and the exhaust pipe 14a. Accordingly, it is possible to arrange the canister 70 in a small space even when the exhaust pipe 14a extends downward at the frontward position of the crankcase 11 from the front part of the engine 10A and then passes below the engine 10A.

Further, in the above embodiment, by the canister 70 being arranged at the space in the vehicle width direction between the pair of right and left downward tubes 22, it is possible to connect the canister 70 to at least one of the pair of right and left downward tubes 22, and therefore, the attachment property of the canister 70 is excellent. Additionally, it is possible to effectively use the space in the vehicle width direction between the pair of right and left downward tubes 22, and therefore, it is possible to arrange the canister 70 efficiently in a small space.

Further, in the above embodiment, by the canister 70 being arranged to be directed in the vehicle width direction, it is possible to more easily arrange the canister 70 at the space in the front-to-rear direction between the engine 10A and the exhaust pipe 14a compared to a case in which the canister 70 is arranged to be directed in the front-to-rear direction, and therefore, the layout efficiency is excellent.

Further, in the above embodiment, by the canister 70 being arranged at the position that is overlapped with the vehicle body right-to-left center line CL in the front view, the center of gravity approaches the center in the vehicle width direction, and therefore, the right-to-left balance of the vehicle is improved.

Further, in the above embodiment, by further including the protection member 80 that protects the canister 70, even when the canister 70 is arranged in the vicinity of the exhaust pipe 14a, it is possible to avoid being easily subject to a thermal impact.

Further, in the above embodiment, by the upper part of the canister 70 being positioned at the space in the vertical direction between the lower end of the fender 16 and the lower end of the cylinder 12, it is possible to guide the air from the frontward direction toward the cylinder 12 by the canister 70, and therefore, the cooling efficiency of the cylinder 12 is improved.

Further, in the above embodiment, the protection member 80 includes the slant part 83 that is slanted such that the more rearward side is located at the higher position, and thereby, it is possible to protect the canister 70 from thermal damage and to guide the air from the frontward direction toward the cylinder 12 by the slant part 83.

Further, in the above embodiment, by the opening part 16h that is directed to the lower position of the oil cooler 90 and that is directed to the upper part of the canister 70 being provided on the fender 16, it is possible to guide the air that passes through the opening part 16h to the upper part of the canister 70, and therefore, the cooling efficiency of the canister 70 is improved. Additionally, it is possible to push up the air to the cylinder 12 side by using the canister 70, and therefore, the cooling efficiency of the cylinder 12 is further improved.

The above embodiment is described using an example in which, in a front view, the center in the vehicle width direction of the canister 70 is arranged at a position that is overlapped with the vehicle body right-to-left center line CL; however, the embodiment is not limited thereto. For example, in a front view, the outside part in the vehicle width direction of the canister 70 may be arranged at a position that is overlapped with the vehicle body right-to-left center line CL. That is, in a front view, at least part of the canister 70 may be arranged at a position that is overlapped with the vehicle body right-to-left center line CL.

Further, the above embodiment is described using an example in which the upper part of the canister 70 is positioned at a space in the vertical direction between the lower end of the fender 16 and the lower end of the cylinder 12; however, the embodiment is not limited thereto. For example, the entire canister 70 may be positioned at a space in the vertical direction between the lower end of the fender 16 and the lower end of the cylinder 12. That is, at least part of the canister 70 may be positioned at a space in the vertical direction between the lower end of the fender 16 and the lower end of the cylinder 12.

The present invention is not limited to the above embodiment. For example, the saddle riding type vehicle includes all vehicles on which a driver straddles a vehicle body. The saddle riding type vehicle includes not only a motorcycle (including a motorized bicycle and a scooter-type vehicle) but also a three-wheeled vehicle (including a vehicle having two front wheels and one rear wheel in addition to a vehicle having one front wheel and two rear wheels). Further, the present invention is applicable to not only a motorcycle but also a four-wheeled vehicle such as an automobile.

The engine of the embodiment is an engine that includes a cylinder (frontward tilted cylinder) which protrudes frontwardly upward but may be an engine that includes a cylinder (rearward tilted cylinder) which protrudes rearwardly upward. Further, the engine of the embodiment is not limited to a so-called transversely mounted engine in which a crankshaft is directed along the vehicle width direction. The engine of the embodiment may be a so-called longitudinally mounted engine in which a crankshaft is directed along the vehicle front-to-rear direction. Even in this case, there are various cylinder arrangements. Further, the power unit may be an apparatus that includes an electric motor as a drive source.

The configuration in the above embodiment is an example of the invention, and various changes such as substitution of the configuration element of the embodiment by a known configuration element can be made without departing from the scope of the invention.

The invention claimed is:

1. A saddle-riding-type vehicle canister arrangement structure which is a canister arrangement structure of a saddle riding type vehicle, comprising:
   an engine that comprises a crankcase;
   an exhaust pipe that extends downward at a frontward position of the crankcase from a front part of the engine and then passes below the engine;
   a canister that recovers an evaporated fuel which is generated at a fuel tank;
   a fender that covers a front wheel from an upside; and
   a protection member that protects the canister,
   wherein:
      the canister is arranged between the engine and the exhaust pipe at a frontward position of the crankcase,
      the engine further comprises a cylinder that protrudes upward from the crankcase,
      at least part of the canister is positioned at a space in a vertical direction between a lower end of the fender and a lower end of the cylinder, and
      the protection member comprises a slant part that is slanted such that a more rearward side is located at a higher position.

2. The saddle-riding-type vehicle canister arrangement structure according to claim 1, further comprising:
   a pair of right and left downward tubes that extend downward from a head pipe, wherein the exhaust pipe extends to a frontward position of the pair of right and left downward tubes from the front part of the engine and is then bent to extend downward, and the canister is arranged at a space in a vehicle width direction between the pair of right and left downward tubes.

3. The saddle-riding-type vehicle canister arrangement structure according to claim 1, wherein the canister is arranged to be directed in a vehicle width direction.

4. The saddle-riding-type vehicle canister arrangement structure according to claim 1, wherein the canister is arranged at a position that is overlapped with a vehicle body right-to-left center line in a front view.

5. The saddle-riding-type vehicle canister arrangement structure according to claim 1, further comprising:
   a protection member that protects the canister.

6. The saddle-riding-type vehicle canister arrangement structure according to claim 1, further comprising:
   an oil cooler that is located at a frontward position of the cylinder, wherein an opening part that is directed to a lower position of the oil cooler and that is directed to an upper part of the canister, is provided on the fender.

* * * * *